Oct. 31, 1933.　　　　D. H. GRANT　　　　1,932,660
AGRICULTURAL MACHINE
Original Filed Oct. 21, 1929　　3 Sheets-Sheet 1

INVENTOR
David H. Grant
BY
Fred C. Matheny
ATTORNEY

Oct. 31, 1933.  D. H. GRANT  1,932,660
AGRICULTURAL MACHINE
Original Filed Oct. 21, 1929   3 Sheets-Sheet 3

INVENTOR
David H. Grant
BY
Fred C. Matheny
ATTORNEY

Patented Oct. 31, 1933

1,932,660

UNITED STATES PATENT OFFICE 1,932,660

AGRICULTURAL MACHINE

David H. Grant, Seattle, Wash.

Application October 21, 1929, Serial No. 401,044
Renewed January 3, 1933

3 Claims. (Cl. 56—60)

My invention relates to improvements in machinery for cutting and handling grasses and grains of the form ordinarily used for hay and the general object of my invention is to provide a machine which will make it both possible and practical to convert vegetation of this class into ensilage as soon as the same is cut and without allowing the vegetation to cure.

Another object is to provide a combined mowing machine, grass cutter and loader which will mow tall grass or like material, cut it up into shorter lengths which are readily handled, and elevate the grass thus cut up into a rack all at one single operation leaving the grass ready to be hauled to the ensilage cutter.

Further objects are to provide cut up and elevating mechanism of this nature which is simple in construction, cheap to manufacture and reliable and efficient in operation.

The vegetation this machine is designed to handle is herein referred to as grass, it being understood that this term includes alfalfa, timothy, oats, vetch and all like vegetation commonly used for hay.

In the harvesting of grass it is common practice to mow the same, then allow it to cure in the sun and air, to form hay, and then to shock, stack or bale the hay after it has cured and dried. Some of the food value of this grass is lost in the drying and curing process. Much of this lost food value can be saved by preserving the green grass as ensilage but the problem of picking up the grass immediately after it is cut and of handling the long tangled grass and feeding it evenly through the ensilage cutter present considerable difficulty, it being apparent that the grass begins to cure and dry out and lose food value as soon as it is cut. My invention overcomes these difficulties by providing means connected with the mower for cutting up the grass as soon as it is moved into lengths short enough to be elevated easily and loaded compactly into a rack and fed easily and evenly to an ensilage cutter. I do not attempt to cut the grass up fine enough for ensilage with my machine but preferably cut it into lengths of from eight to twelve inches, thus preventing the grass from becoming a tangled mass and making it possible to elevate the grass easily and to dump the grass and feed it evenly to the cutter, in unloading.

Other and more specific objects of the invention will be apparent from the following description taken in connection with the accompanying drawings.

In the drawings Figure 1 is a plan view of a mowing machine equipped with cutting and elevating mechanism constructed in accordance with my invention, parts of the reel being broken away.

Like reference numerals designate like parts throughout the several views.

Figure 1:
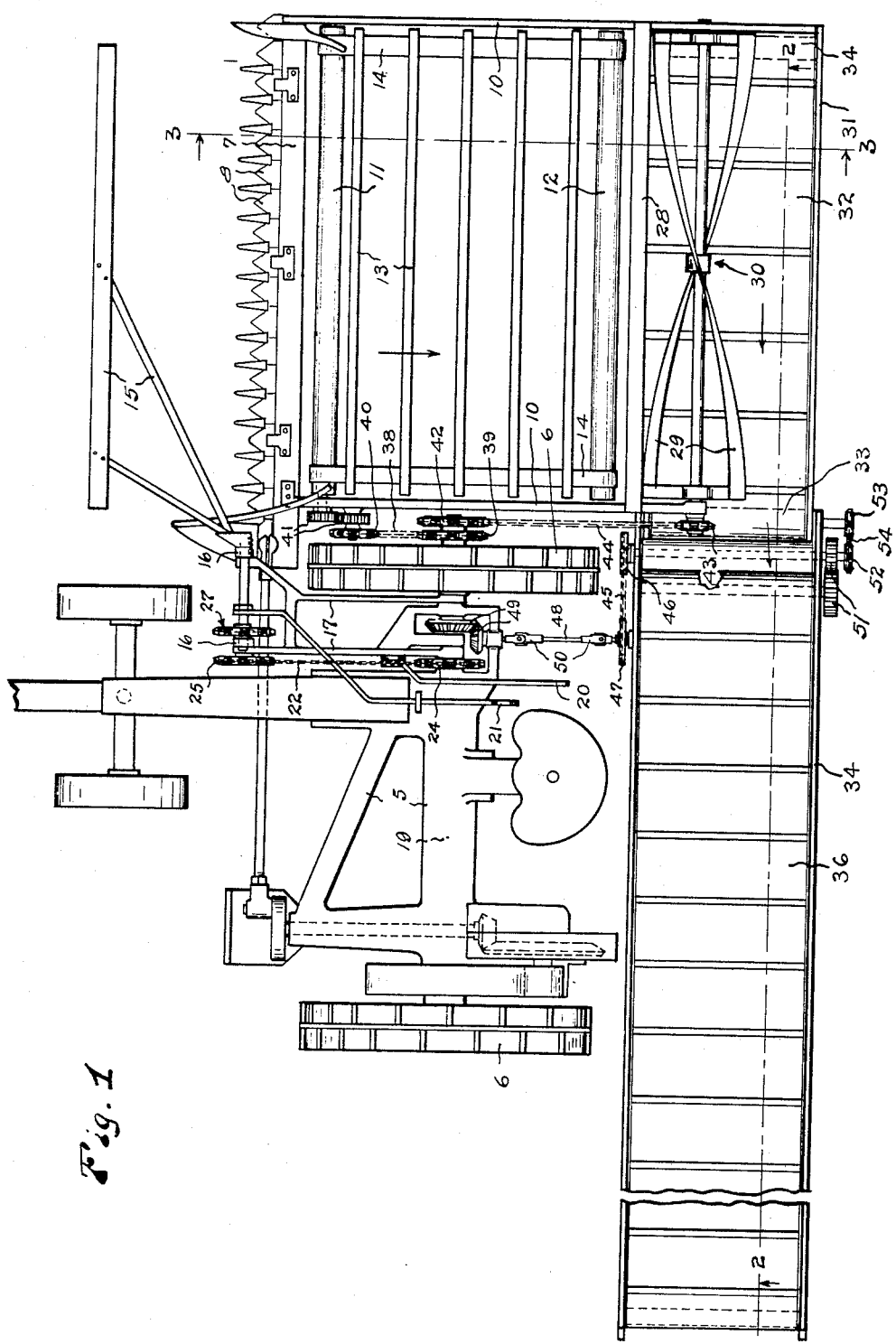
Figure 2:
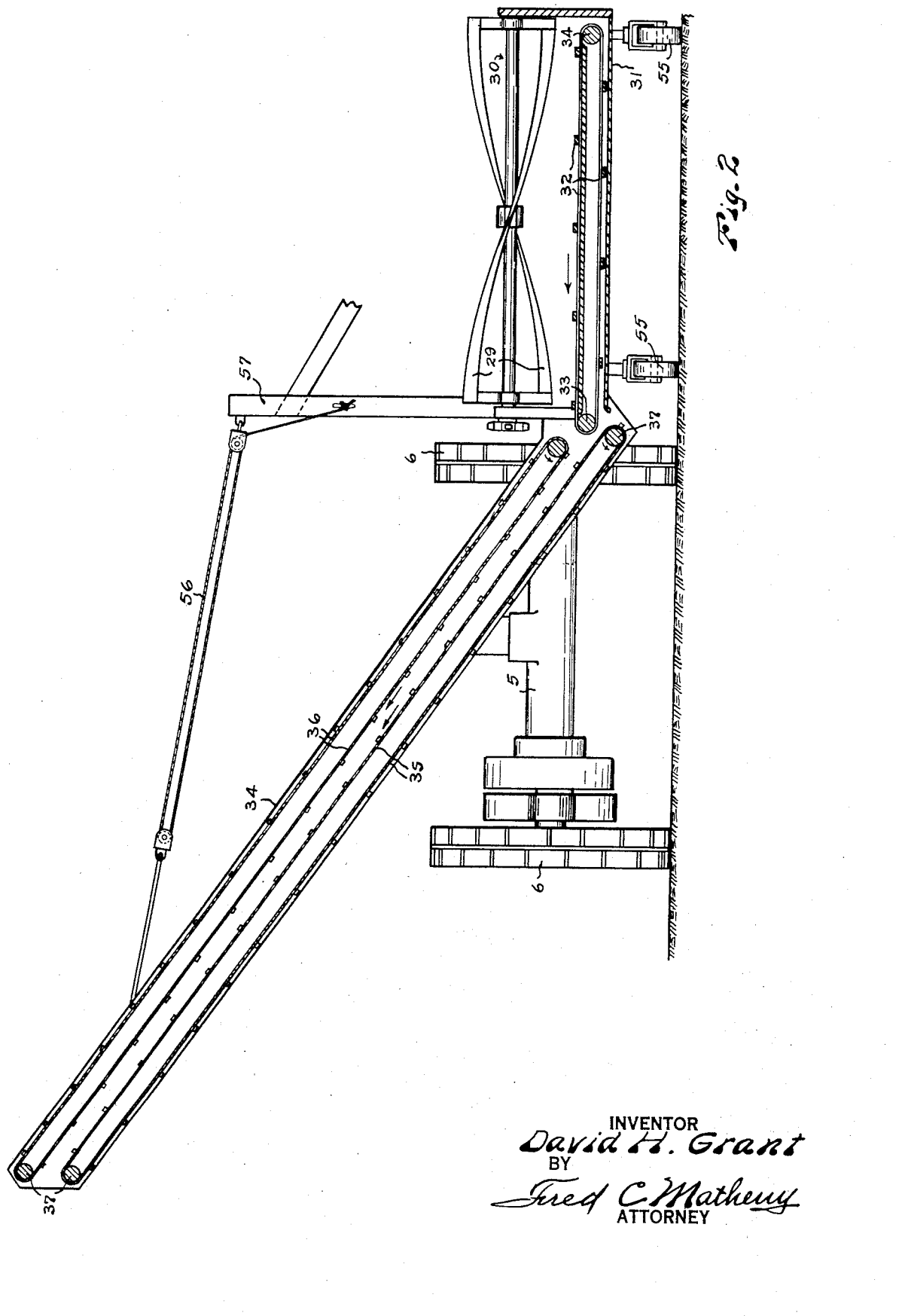
Fig. 2 is a view partly in rear elevation and partly in section of the same taken substantially on broken line 2—2 of Fig. 1, parts being omitted.

Referring to the drawings I show a mowing machine embodying a frame 5, wheels 6, a sickle bar 7 and a sickle 8 which is arranged to be reciprocated in the sickle bar in the usual manner to cut grass or like vegetation. All of the above parts are of the usual well known construction but are preferably made heavier and stronger to withstand the additional strain of my cutting and elevating means and to furnish the tractive force necessary for driving the same.

In accordance with my invention I provide means for catching and elevating the grass as it falls backwardly from the sickle, means for cutting up said grass into shorter lengths convenient for loading and handling, and means for loading the cut up grass onto a wagon or similar conveyance by which it may be hauled away. These several devices are all connected with a mowing machine and may be driven from the main shaft of the mowing machine in the manner hereinafter set forth. The tongue of the mowing machine may be supported on trucks 9 to withstand side draft to which the machine may be subjected.

Figure 3:
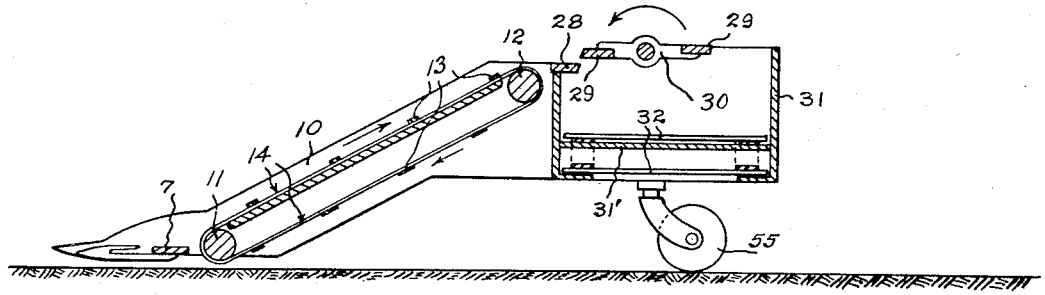
Fig. 3 is a sectional view substantially on broken line 3—3 of Fig. 1, with parts shown in elevation.
Figure 4:
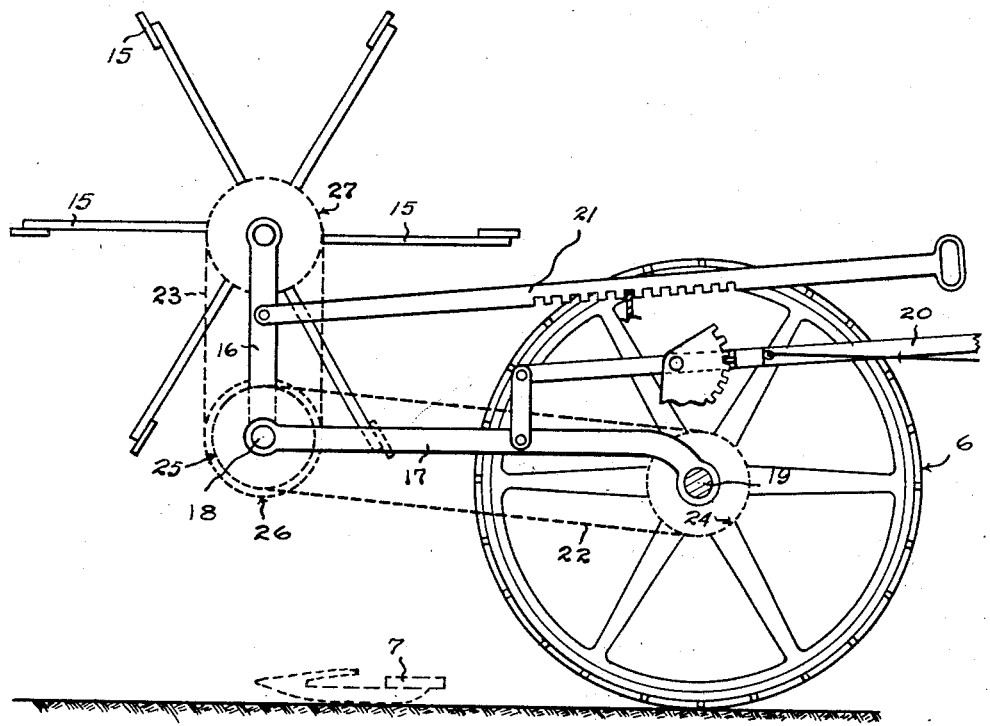
Fig. 4 is a detached elevation of the reel supporting and adjusting means shown in operative relation to a wheel and main shaft of the machine.

My attachment comprises a frame 10 secured to the sickle bar 7 and extending rearwardly and upwardly therefrom. Rollers 11 and 12 are provided at the respective front and rear ends of the frame 10 and conveyor means, preferably in the form of cross slats 13 on belts 14, is operatively disposed on said rollers and arranged to be moved in the direction indicated by the arrows in Figs. 1 and 3 over a platform 10' in the frame 10 to elevate vegetation which falls onto the same. If desired sprocket wheels may be used instead of the rollers 11 and 12 and link belts may be substituted for the belts 14. A reel 15 is disposed above the sickle bar to sweep the grass or like vegetation back onto the slat belt 13—14. This reel is preferably supported for rotation by brackets 16 and 17 which are connected with each other by a pivot 18. The rear end of the bracket 17 is pivotally mounted on the main shaft 19 of the mower and the front end of said bracket 17 is arranged to be raised and lowered by a lever 20 to adjust the reel vertically. The bracket 16 is arranged to be swung on the pivot 18 to adjust the reel forwardly and rearwardly by a lever 21. The reel is driven from the main shaft 19 by sprocket chains 22 and 23 operating on sprocket wheels 24, 25, 26 and 27.

The slat belt conveyor 13—14 carries the grass up and discharges it over a cutter bar 28 where said grass is caught by the blades 29 of a rotary cutter 30 and cut up into lengths which are short enough to elevate easily and to load compactly and to dump or discharge easily from a rack or wagon. The relative speed of the conveyor and the rotating knife are preferably adjusted so that the grass will be cut at intervals of from eight to twelve inches. This leaves the grass short enough for convenient elevating and handling without necessitating the expenditure of a great amount of power in cutting. From the cutter the material drops onto a horizontal conveyor embodying a frame 31 having an endless conveyor member 32, in the nature of an endless slat belt or apron, movable on rollers 33 and 34. Where a slat belt conveyor is used a tight bottom 31' is essentially provided in the frame 31.

The conveyor 32 delivers the material onto an elevator 34, preferably embodying a lower endless apron 35 and an upper endless apron 36, both movable on rollers 37. This elevator elevates the material into any suitable receptacle as a rack which may be moved along under the upper end of the elevator as the machine progresses.

All drives are preferably from the main shaft 19 of the mowing machine. The conveyor 13—14 just back of the sickle bar is driven by a link belt 38 operating on sprocket wheels 39 and 40 and connected by gearwheels 41 with the roller 11. The sprocket wheel 39 is on the main shaft 19 of the mowing machine. The gearwheels 41 are used to obtain the correct direction of rotation of the roller 11.

The rotary cutter has a direct driving connection with the main shaft 19 through a sprocket wheel 42 on the main shaft, another sprocket wheel 43 on the shaft of the cutter and a link belt 44 operative on the sprocket wheels 42 and 43. The rotary cutter is preferably relatively heavy in construction so that it will have substantial momentum at slow speeds and the blades thereof are preferably curved like the blades of a lawn mower so that only a short portion of any blade will be cutting at one time. This keeps the cutting torque substantially constant.

The lower elevator apron 35 is driven by a link belt 45, sprocket wheels 46 and 47, shaft 48, and bevel gears 49 which are connected with the main drive shaft 19 of the mowing machine. A universal joint 50 is preferably provided in the main drive shaft 19. The upper elevator apron 36 is driven from the lower apron by gears 51. The horizontal conveyor belt 32 is driven from the driving means of the lower apron by sprocket wheels 52 and 53, and link belt 54.

The horizontal conveyor 31—32 and parts connected therewith are supported for movement on caster wheels 55, two of which may be provided. The lower end of the elevator 34 is secured to the end of the horizontal conveyor 31 and the outer end of said elevator is further supported by tension means 56 connected with an upright support 57 on the conveyor frame 31. If desired the tension means 56 may be adjustable.

In the operation of this machine the grass or like vegetation is cut by the sickle 8 and caused by the reel 15 to fall onto the conveyor 13—14 by which it is moved upwardly over the cutter bar 28 and is cut up into shorter lengths by the rotating cutter 30. The cut up grass drops onto the horizontal conveyor 32 by which it is delivered to the elevator and elevated into a rack. The green grass, when thus cut into relatively short lengths will, load easily in the rack and is easy to handle and to feed evenly into an ensilage cutter.

My machine thus makes it possible to take the grass from a mowing machine as soon as it is cut and make ensilage of such grass with a minimum of time and effort.

The foregoing description and accompanying drawings clearly disclose a preferred embodiment of my invention but it will be understood that this disclosure is merely illustrative and that such changes in the invention may be made as are fairly within the scope and spirit of the following claims.

I claim:

1. The combination with a mowing machine embodying a frame mounted on two wheels and having a sickle bar which extends sideways from the wheels and the frame in front of the wheels, of a conveyor rigidly connected with said sickle bar and extending upwardly and rearwardly from said sickle bar at the side of the wheels past the frame, a horizontal conveyor extending crosswise of said inclined conveyor underneath the rear end of the same, an elevator and loader disposed in line with said horizontal conveyor for receiving material from the same and extending past the rear of said mower wheels and frame and inclined upwardly for elevating material into a rack, and means for driving said conveyors and said elevator and loader.

2. The combination with a mowing machine embodying the usual frame mounted on two wheels and having a sickle bar extending outwardly to one side of the wheels and frame, an inclined conveyor connected with said sickle bar and extending upwardly and rearwardly therefrom at one side of said wheels said conveyor including endless moving apron means, a cutter bar at the rear end of said inclined conveyor, a rotary cutter cooperating with said cutter bar for cutting vegetation elevated by said inclined conveyor, a horizontal conveyor extending crosswise of said inclined conveyor underneath said cutter, an elevator and loader extending crosswise and upwardly past the rear of said mower wheels and connecting with said horizontal conveyor, and means connected with the main shaft of said mower wheels for driving said conveyors and said rotary cutter.

3. The combination with a mowing machine, embodying the usual frame mounted on two wheels and having a sickle bar extending outwardly to one side of the wheels and frame, said wheels having a common shaft, an inclined conveyor frame connected with said sickle bar and extending upwardly and rearwardly therefrom at one side of said wheels, a moving conveyor belt on said conveyor frame, caster wheels supporting the rear end of said conveyor frame, driving means positioned between said conveyor frame and the adjacent mower wheel and connecting said conveyor belt with said mower wheels, rotary cutter means at the rear end of said inclined conveyor frame, driving means connecting said rotary cutter means with said mower wheels, a horizontal conveyor extending crosswise of said inclined conveyor underneath said cutter, an elevator in prolongation of said horizontal conveyor extending crosswise to the rear of said mower wheels at an upward incline, and means connected with the shaft of said mower wheels for driving said horizontal conveyor and said elevator.

DAVID H. GRANT.